(12) United States Patent
Hard

(10) Patent No.: US 6,641,738 B2
(45) Date of Patent: Nov. 4, 2003

(54) WATER/OIL SEPARATOR AND USE THEREOF

(75) Inventor: Russ R. Hard, Newberg, OR (US)

(73) Assignee: Rehrig Pacific Company, Los Angeles, CA (US)

( * ) Notice: Subject to any disclaimer, the term of this patent is extended or adjusted under 35 U.S.C. 154(b) by 231 days.

(21) Appl. No.: 09/931,518

(22) Filed: Aug. 16, 2001

(65) Prior Publication Data

US 2003/0042213 A1 Mar. 6, 2003

(51) Int. Cl.$^7$ .......................... B01D 15/04; B01D 24/12; B01D 39/00
(52) U.S. Cl. ..................... 210/693; 210/196; 210/291; 210/502.1
(58) Field of Search ................................ 210/671, 690, 210/691, 692, 693, 196, 242.4, 291, 502.1

(56) References Cited

U.S. PATENT DOCUMENTS

| | | | | |
|---|---|---|---|---|
| 4,061,573 A | * | 12/1977 | Biron | 210/282 |
| 4,497,707 A | * | 2/1985 | Anderson | 210/136 |
| 4,722,800 A | | 2/1988 | Aymong | |
| 4,915,823 A | * | 4/1990 | Hall | 210/95 |
| 5,265,640 A | * | 11/1993 | St. Amant | 137/114 |
| 5,277,797 A | * | 1/1994 | Hargest | 210/86 |
| 5,296,150 A | | 3/1994 | Taylor | |
| 5,520,825 A | | 5/1996 | Rice | |

OTHER PUBLICATIONS

AFL Industries Inc. Product bulletin, "Vertical Tube Coalescing Separator (VTG) 100–3, 600 GPM," (1992).
AFL Industries Inc. Brochure, "Industrials and Municipal Problem Solvers."
Common Sense recovery Brochure, "Why Spend A Fortune? Use Common Sense Recovery."
Facet Quantek Brochure, "Facet Quantek ROWS Series Coalescing Plate Separators to Reduce Oil Content in Water to 15ppm or Less."
Facet Quantek Brochure, "Coalescing Plate Separators for Environmental Clean–Up and Resource Recovery," (1991).
General Industries, Inc. Brochure, "Helping Maintain Our Water as a Useable Resource in Compliance with Governmental Regulatory Standards."
McTighe Brochure "Oil Water Separator, Designed for Separation of Free Oils and For Free Spill Requirements," (1984).
Monarch Separators, Inc. Brochure "Economical Gravity Operated Corrugated Plate Separators."
Oldcastle Brochure, "When You Choose an Oil Water Separator, Make Sure You Get One Basic Fact."
Tank Engineering Specialities, Inc. Brochure "Oil Water Separator for Today and Tomorrow."
Highland Tank Oil Water Separator Brochure (1987).

* cited by examiner

Primary Examiner—Chester T. Barry
(74) Attorney, Agent, or Firm—Brooks Kushman P.C.

(57) ABSTRACT

A process for the removal of oil from oil-contaminated water is efficient, inexpensive, and capable of oil removal to a level where the water may be disposed of by conventional sewage treatment or reused. The apparatus which performs the process consists of an elongate housing having at least one upwardly extending oil collection tower and an oily water inlet mediate the oil or oil-enriched water outlet and the "clean" water outlet. The elongate housing and preferably also the oil collection tube are filled with beads of hydrophobic polymer.

20 Claims, 2 Drawing Sheets

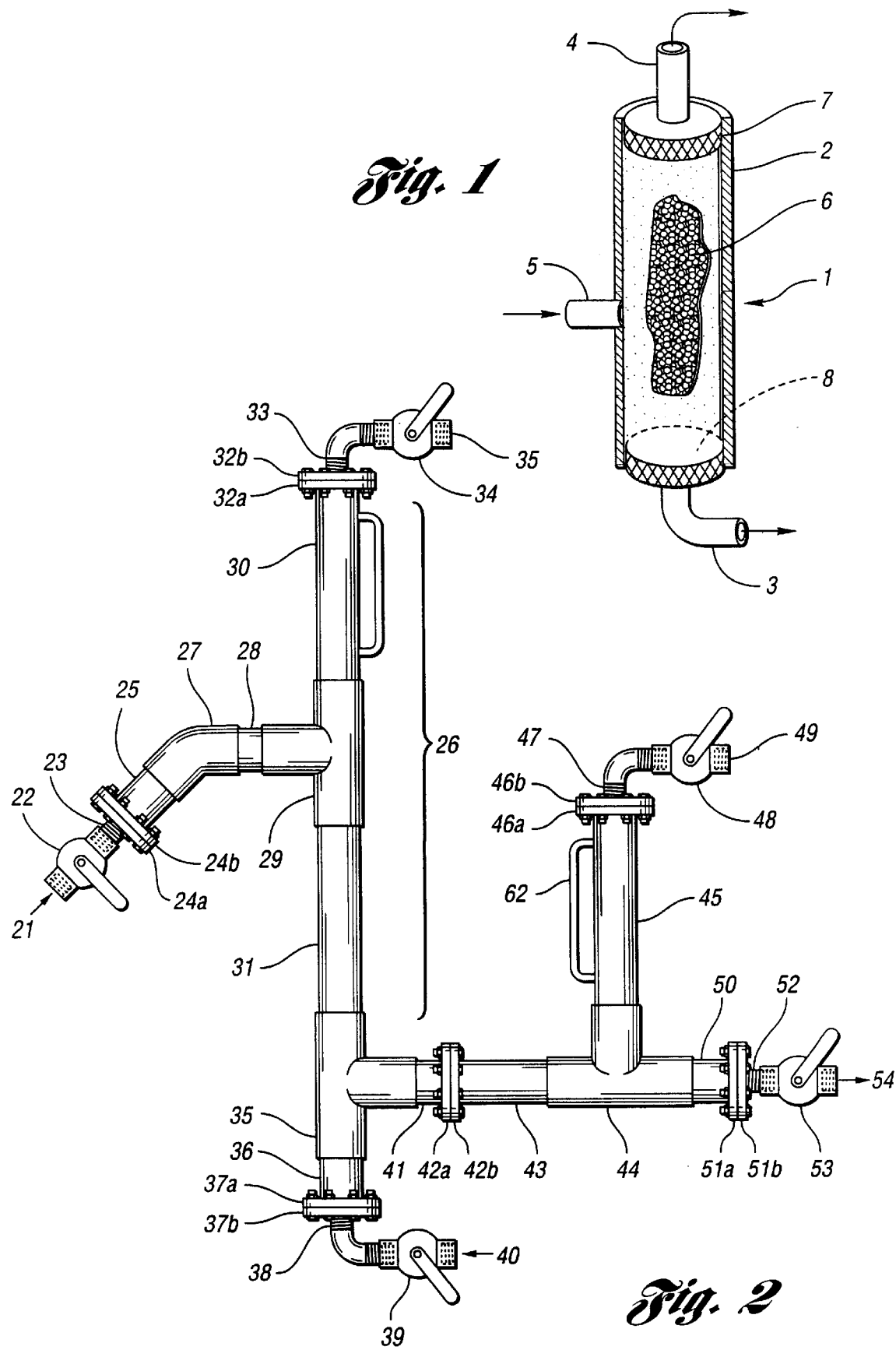

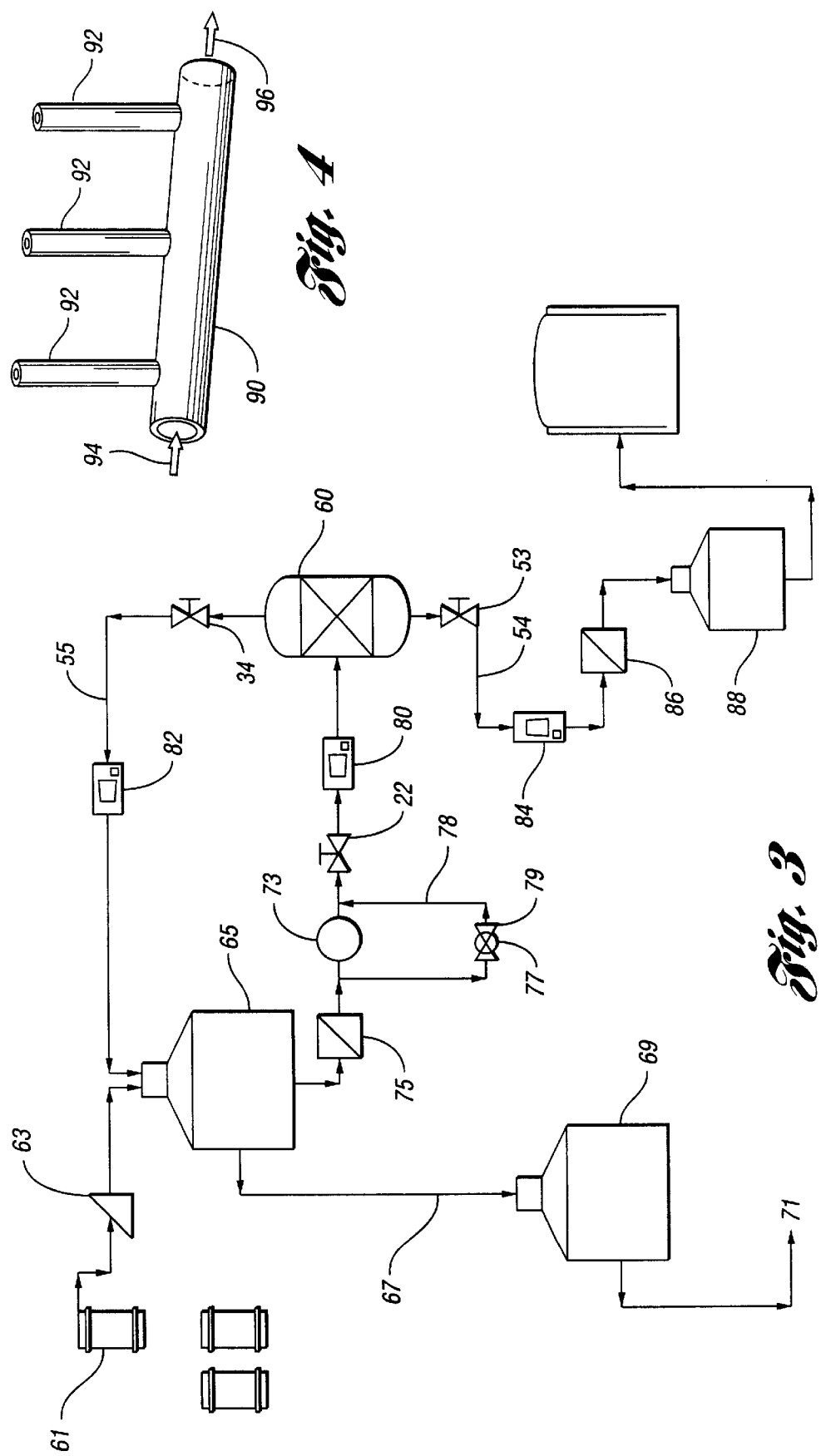

WATER/OIL SEPARATOR AND USE THEREOF

BACKGROUND OF THE INVENTION

1. Field of the Invention

The present invention pertains to a separator for use in separating oil from oily water. The oil/water separator is particularly useful in industrial manufacturing plants where oil-contaminated water is produced by manufacturing processes such as molding operations, lubricating applications, machining operations, etc.

2. Background Art

Separation of oil from oil-contaminated water has long been problematic in numerous fields. In oil production, for example, the recovery of oil is generally accompanied by recovery of water at the same time. In wells where recovery proceeds by secondary or tertiary methods, the major portion of liquid may be water rather than oil. Following separation of the bulk of the oil from the recovered liquid in these processes, the water which remains is highly contaminated by oil, and thus cannot be disposed of without environmental concerns.

In manufacturing, removal of mold releases when cleaning molds, oil spills, dripping of lubricating oils and greases from conveyor belts, leakage of oil from hydraulic systems, and machining operations are but a few examples of oil loss which may end up as oil-contaminated water. Oily water which contains less than 100 ppm oil can be processed by conventional sewage plants, and thus may be disposed of relatively economically in this fashion, incurring but a modest sewage treatment cost. However, it is desirable from the standpoint of environmental stewardship to have as low an oil content as is reasonably economically possible.

For oily water with higher oil content, disposal is most problematic. In at least some areas of the United States, oily water disposal costs may run as high as $1.50/gallon ($0.40/l). For manufacturing plants which can easily produce 2000–3000 gallons of oil water per month, annual disposal costs are quite high. Recycling of the oily water without treatment is not practical, as the oil content continues to increase. Moreover, the relatively high levels of oil result in fouled process equipment which requires shut down and cleaning, or even replacement.

Separation of oil and water mixtures at the site of its production has been in use for many years. Older methods of separating required long periods of quiescent standing in large settling tanks, or use of special surfactants to destabilize oil emulsions. While such processes may be used with very heavy contamination such as that encountered in oil production, they are inefficient and not cost effective at lower oil contamination levels when used alone. Moreover, the water effluent is still likely to contain undesirable oil levels, i.e. levels greater than 100 ppm.

Mechanical separators have been in widespread use for many years. While such separators may take a variety of forms, including portable separators, virtually all require special coalescer plates or replaceable cartridges containing such plates. The coalescer plates are composed of or covered with a hydrophobic substance to which the oleophilic oil droplets are attracted, and coalesce. The plates are of limited surface area, and generally require a non-turbulent, laminar flow. The laminar flow prevents efficient separation, as oily water in the center of the flow path may pass through such devices without contacting the plates; thus, the oil mass transfer coefficient is low. Moreover, because of the need to produce cartridges with many closely spaced but separated plates, manufacturing costs of the coalescer cartridges and replacement cartridges is high. Examples of such oil separators employing parallel coalescer plates or equivalent devices are those described in U.S. Pat. Nos. 4,072,614; 4,149,973; 4,199,451; 4,333,835; 4,722,800; 5,296,150; 5,520,825, and 5,928,524. Finally, existing oil separators tend to be very expensive, and often must be operated either at very low flow rates or connected in series to provide oil separation to below 100 ppm oil in the aqueous effluent. Many of these separators are incapable of separating emulsified oil.

It would be desirable to provide an oil and water separator which is itself inexpensive, which employs an inexpensive oil separation means, and which is efficient in separating oil to levels considerably below 100 ppm. It would further be desirable to provide an oil and water separator which can be used at reasonable flow rates without impeding separation efficiency, and which is capable of separating oil even from oil/water emulsions.

SUMMARY OF THE INVENTION

It has now been surprisingly discovered that a highly efficient and cost effective oil separator may be constructed which is effective to remove oil to levels well below 100 ppm without employing parallel coalescer plates and laminar flow. The oil/water separator comprises a hollow elongate housing having an oil/water inlet mediate an oil outlet and an effluent outlet, the hollow elongate housing filled with hydrophobic polymer beads or granules or hydrophobic polymer coated beads or granules.

BRIEF DESCRIPTION OF THE DRAWINGS

FIG. 1 illustrates a minimal embodiment of an oil/water separator of the present invention;

FIG. 2 illustrates a preferred embodiment of an oil/water separator of the present invention; and FIG. 3 illustrates an industrial schematic of a preferred embodiment of an oil/water separator of the present invention.

FIG. 4 illustrates a further embodiment of an oil/water separator.

DETAILED DESCRIPTION OF THE PREFERRED EMBODIMENTS

The invention may best be understood with reference to a simple embodiment as described in FIG. 1. In FIG. 1, the elongate housing 2 of the oil/water separator 1 is a hollow tube having an effluent (water) outlet 3, an oil outlet 4, and mediate these outlets, an oil/water inlet 5. The elongate housing 2 contains hydrophobic polymer beads 6. Near the top of the separator is a retaining screen 7 which may be of plastic or stainless steel mesh or other material, with a mesh size such that the polymer beads will be retained within the device. A similar screen 8 is positioned prior to the water outlet at the bottom of the device for the same purpose.

In operation, an oil/water mixture is introduced into oil/water inlet 5. The oily water contacts the hydrophobic beads, which attract the oil because of their hydrophobic/oleophilic nature (hereinafter, "hydrophobic"). As the oil collects on the beads, it coalesces into larger droplets which, due to their buoyancy, rise toward the top of the device, ultimately exiting the oil/water separator through the oil outlet 4. Water continues to flow toward the water outlet 3.

In general, the "oil" flowing from the oil outlet is a water and oil mixture enriched in oil, although in some devices the "oil" may consist of greater than 80% oil, preferably greater than 90% oil.

This simplified device is useful in explaining the general principles involved. However, in practical use, each of the respective inlets and outlets would be valved, and the oil/water mixture would be supplied by a pump from an oil/water storage reservoir. Also, a sight glass is preferably mounted on the side of the unit to monitor the oil level. For the best separation, a portion of the total effluent may be recirculated to the oil reservoir, either continually, or only during periods of heavy oil contamination or high flow rates. The highly enriched "oil" from the oil outlet may serve this purpose. This recycle, rather than total separation of oil, improves the flow rate without decreasing efficiency. The additional embodiments will be further described with respect to the oil/water separator of FIG. 2 and the schematic of FIG. 3.

As to the components and materials of construction of the subject invention oil/water separators, a great deal of flexibility can be maintained. For the elongate housing, virtually any substantially non-corrosive material may be used. The housing may have any cross-section convenient, including but not limited to square, rectangular, elliptical, circular, etc. For the most economical manufacture, a circular cross-section by virtue of construction from conventional tubing and piping materials is much preferred. For example, use may be made of stainless steel tubing, aluminum tubing, cast iron pipe, or cast steel pipe. However, pipe or tubing of plastics such as polyethylene, polypropylene, polybutylene, or polyvinylchloride, all the latter optionally fiber-reinforced, are preferred. Standard PVC pipe is most preferred. The material selected should be compatible with oil, water, and oil/water mixtures. It is preferred to use materials which are themselves hydrophobic, since their surface then contributes to the overall separation efficiency.

The pipe wall thickness is calculated to be such that the pipe will not burst under standard operating conditions. In general, the housing will not be subject to high pressure, except in the case of very tall units, where considerable pressure may be exerted toward the bottom of the housing by the head of water above. Calculation of the wall thickness is done according to standard methods of engineering. In general, Schedule 40 tubing, and more preferably Schedule 80 tubing, is satisfactory. Pipe fittings such as flanges, elbows, etc. should be selected with regard to similar considerations.

The housing cross-sectional area may be selected with regard to the volume of oily water being processed. In general, it is practical to oversize the unit considerably due to its low cost. A system shown in FIG. 2 and made of 8-inch (200 mm) Schedule 80 PVC tubing has been shown to produce very low levels of residual oil contamination at an influent rate of approximately 9 gal/hr and a recycle ratio of 3 gal/hr, yielding 6 gal/hr of "clear" water.

The hydrophobic polymer 6 may be selected from any which have a natural affinity for oil. Most oils used are derived from petroleum or natural sources and have similar chemical structure containing hydrophobic groups of significant size. For most of these oils, including the so-called "mineral" oils and triglyceride oils such as olive, canola, peanut, and the like, conventional polyolefin beads or granules may be used advantageously. These include polyethylene, polypropylene, polybutylene, and the like. As also with the piping materials, copolymers such as copolymers of ethylene and propylene or of ethylene and hexene and/or octene are advantageously used. Preferably, polyethylene is used, more preferably polyethylene of high density (>0.94 g/cm$^3$). For oils which contain significant ester groups, such as alkanol diesters of dicarboxylic acids, it may be preferable to replace all or part of the preferred polyolefin beads with polyester beads such as beads of polyethylene terephthalate or polybutylene terephthalate. As with the materials of construction, the beads must be compatible with the oil and water mixture. However, as the beads are not load carrying, the effect of oil and water on their strength properties is not especially important.

The shape of the beads can be varied, as can their size. The term "beads" herein and in the claims pertains to hydrophobic polymer particles of any shape. Round and cylindrical shapes are preferred. The size of the beads should range from about 50 μm to 5 mm, more preferably 100 μm to 3 mm, and most preferably 200 μm to 2 mm. When the "bead" has an elongate shape, the size refers to its cross-section orthogonal to its length. For such beads, the aspect ratio should be less than 20:1, preferably less than 10:1, more preferably less than 5:1, and most preferably from 1:2 to 2:1. For irregular beads, the size refers to the average diameter from the geometric center. Sizes will of course vary. The sizes quoted herein are number average sizes which may be calculated by standard techniques. Preferred beads also include agglomerates of smaller particles, such as those in the range of 50 nm to 50 μm, provided the agglomerates are generally stable under the operating conditions. The beads may also be porous, although this is not preferred. Round beads which provide a void fraction between 0.2 and 0.45, preferably 0.3 to 0.4, and most preferably about 0.35 are advantageous.

Solid polymer beads or granulates (flakes or extrudates) are preferred, since these are readily available commercially. However, it is also possible to use metal spheres, cylinders, and the like, coated with hydrophobic polymer film. For example, small stainless steel balls or cylinders, e.g. having a size of 1 mm to 2 mm may be advantageously used. Because of the greater density of such beads, the topmost bead retaining screen or screens may be dispensed with, although its presence is still desirable. Such polymer coated beads are included within the terms "beads" and "polymer beads" unless indicated otherwise.

The retaining screens have holes to allow oil and/or water flow, preferably without generating any significant back pressure. The hole size should be small enough to retain substantially all the polymer beads within the housing. Screens may be made of metal perforated with holes, or may be simple wire screens of the appropriate mesh. The screens may be maintained between flanges, in a separately attached housing, or by any equivalent means known in the art to retain such devices. When cartridge filters are used in the inlet stream and/or the outlet stream, polymer bead-retaining screens are not necessary.

FIG. 2 illustrates a preferred embodiment of the present invention oil/water separators. The oil/water separator of FIG. 2 is made substantially from standard 8" diameter Schedule 80 PVC piping and associated fittings. In FIG. 2, the inlet 21 is through valve 22. Valve 22 is mounted by means of a standard ½ inch (12.5 mm) pipe nipple 23 which is threaded into and then glued into flange 24a. Flange 24a is a standard flange and is bolted to its mate flange 24b. Flange 24b is also a standard PVC pipe flange which is glued into the 8-inch inlet section 25. For purposes of this particular installation, it was desired to have an upward angled inlet, and thus the inlet section 25 is connected to the main body 26 by means of 45° elbow 27 and short pipe section 28. The inlet is connected to the main body 26 by means of a standard "T"-fitting 29. The main body above and below the T-fitting consists of additional lengths of 8" PVC pipe, in this case an upper length 30 of about 31 inches and a lower length 31 of about 36 inches. The lengths as well as diameters can of course be varied. The top of the section 30 is surmounted by a pair of flanges 32a and 32b, with a one-half inch (12.5 mm) nipple 33 attached as before, and connected to a valve 34. The bottom of the main body terminates in T-fitting 35, at the bottom of which is a short length of pipe 36 terminated by flange pairs 37a and 37b. As with the other flanges, this flange has connected to it nipple 38 and ball valve 39. The external end of valve 39 is a purge inlet 40, thus valve 39 is normally closed. The purge line and valve may also advantageously be located on the same flange as the water effluent stream 54. The water effluent stream 54 is preferably located at the lowest point of the flange. The valves may be gate valves, ball valves, or valves of other types. The valves on the system are not necessary components in many cases, and can be replaced with other flow control means, including flow control which is automated under computer control.

From the side of T-fitting 35, a short length of pipe 41 and flanges 42a and 42b allow the forward section of the separator (1 to 42a) to be disconnected from the remainder for maintenance, cleaning, refilling, etc. Flange 42a is attached to horizontal pipe section 43 which terminates at T-fitting 44. Extending vertically from T-fitting 44 is pipe section 45, terminated at the top by flanges 46a, 46b, threaded elbow 47, and valve 48. The external end of valve 48 is a second oil effluent stream 49. The remaining section of T-fitting 44 is connected to a further pipe section 50, flanges 51a and 51b, nipple 52, and valve 53. The outlet from valve 53 is the water effluent stream 54. As indicated previously, the outlet for water effluent stream 54 is preferably located at the lowest possible point. The principle oil effluent stream 55 is the outlet of valve 34. The entire device, to the extent possible, is filled with high density polyethylene pellets (beads) available from ROC.

The separator portions where oil accumulates (30,45) are preferably equipped with a sight glass to be able to determine the oil/water interface height, or more usually an (oil/water)/water interface height, as there will usually be a demarcation between the substantially oil-free water and the mass of mixed oil and water above it. The sight glasses can take any convenient form, for example, a pair of nipples, covered at their inner ends with screen (to prevent entry of beads) and having transparent vinyl tubing therebetween. Sight glasses are also commercially available.

Most preferably, the sight glass of the main body extends along the full vertical length of the oil/water separator, for example extending from the top of upper length 30 of the main body 26 to the bottom of lower length 31. The second sight glass 62 preferably extends from the top of pipe section 45 to the middle of T-fitting 44.

The oil/water separator of FIG. 2 is operated with a variety of auxiliary equipment depending upon the desired application and location, etc. Operation can best be described with reference to both FIGS. 2 and 3. Valves, etc. have common numerals in these Figures whenever possible.

FIG. 3 utilizes a device in accordance with FIG. 2 as oil/water separator 60. Oil initially arrives at the separator by piping from the well, manufacturing plant, etc., or as shown here, in oil drums or garbage cans 61 of oily water. The oily water is preferably initially filtered to remove contaminants of major size. For example, a screen filter 63, preferably of stainless steel mesh, may be used for this purpose. The oil water enters the oil and water storage tank 65 where it preferably is allowed to settle or become quiescent. An oil line 67 runs from a top portion of the tank to an oil storage tank 69. From tank 69, oil collected can be burned, disposed of (71), or recycled/reprocessed.

From the oil and water storage tank 65, oily water is pumped by means of pump 73. Prior to entering pump 73, the oily water preferably passes through a 50 micron filter cartridge 75. Filter cartridges of smaller or larger pore sizes may be used, or the filter may be dispensed with. Such filter cartridges are widely available. Without the filter, additional down time would be expected. Eliminating the filters may also result in increased pump wear and a decrease in cleanliness of the unit, ultimately lowering separation efficiency. The pump 73 is equipped with a full flow bypass loop 78, regulated by valve 79. The bypass loop is generally used in the startup mode, and the recycle loop 78 is generally made of relatively large diameter pipe to avoid heating of the bypass loop liquid. However, a bypass loop, heat exchanger, small capacity tank, or other means may be used to ensure the pump is not damaged.

From the pump, the liquid runs through valve 22, and through flow meter 80 (optional) and enters the mediate oil/water inlet (21 in FIG. 2, prior to valve). The feed stream entering the oil/water separator contacts HDPE beads onto which the oil preferentially clings, slowly coalescing, and rising against the rather gentle flow of water. Oil or highly oil-enriched water rising to the top flows back to oil and water storage tank 65 through flow meter 82.

As indicated previously, the flow of oil from the top of the separator is generally not oil alone, but a mixture of oil and water containing a significant portion of oil. It is for this reason that the principal oil effluent stream 55 is preferably recycled to the oil/water reservoir to have a chance to settle. In devices having low enough flow rates and a tall enough oil-containing portion of the main body of the separator ("oil collector"; above the inlet 21 of FIG. 2), a substantially pure oil containing fraction may be obtained. In such case, the oil may be delivered directly to an oil holding tank, preferably one with a water drain near the bottom of the tank to remove traces of water which may separate. In the separator of FIG. 2, it is preferable that about ⅓ of the total throughput be recycled to the oil/water storage tank as a water-containing oil effluent stream. The amount in any given installation may vary from 0 to 70%, but preferably is from 10% to 40%, more preferably 15% to 50%, yet more preferably 20% to 40%, and most preferably in the range of 25% to 35%. Slow flow rates generally require low or no recycle. Devices with taller oil collection columns above the inlet, or devices with multiple oil collection columns above the inlet require no or less recycle. Water with an initially larger amount of oil or containing emulsified oil generally require larger recycle. Recycle is generally preferred for most operating conditions.

The flow rates, recycle rates, etc., may be adjusted in the field to determine the flow rates, etc., required for the desired efficiency. The oil content of water may be monitored in the field by conventional testing equipment, for example by the "Oil/Water Field Test Kit" available from Handy Environmental Laboratory Procedures (H.E.L.P.), Inc., 1721 East Avenue, Katy, Tex. 77493. However, other test kits and/or methods are suitable as well.

The water effluent stream 54 is largely free of oil, and can be added to sewage, or for other uses, i.e. for use in cooling towers. In FIG. 3, the water effluent 54 passes through flow meter 84 and through a 30 micron filter 86 and into a surge tank 88 from which it is retrieved for disposal or use. It is highly preferable that at least two flow meters are employed, one in the inlet feed and one in the effluent stream. A flow meter is also preferred in the recycle stream.

The secondary oil effluent line 49 (FIG. 2) is ordinarily not used. Some residual oil may accumulate in this separator housing portion. However, the amount is relatively small in relation to that which accumulates below the principle oil effluent line 55. Thus, in small- to medium-sized operations, this line is generally opened only when the sight glass indicates a major accumulation of oil.

The start up and running of the separator which follows is for the unit of FIG. 2. For larger or smaller units, the various flow rates, recycle rates, etc. will be adjusted accordingly. On the initial startup of the unit, it must be completely filled with water and all the air purged from the system. The unit is filled with a water line (i.e. garden hose) and is leak-tested in this manner. The outlet valves are used to purge the air as the unit fills, and then they are closed to keep the unit full of water. The separation unit must always be full of fluid; otherwise the water purity will be compromised. Once the unit has passed the leak test, it must be hooked up to the auxiliary equipment (hoses, valves, flow meters, filters, pumps, etc.) without losing the water initially charged to the unit. The air in the lines and other auxiliary equipment must be purged as well. On startup, the outlet valve on the oil/water storage tank is fully opened and the throttling valve in the bypass loop for the pump is fully opened. The valve for controlling the inlet flow into the unit is completely closed. The pump is then switched on. Clear vinyl tubing can be used in order to ensure that the filter and bypass loop are working properly. Once the pump, filter and bypass loop are working properly, the valve to the separation unit is opened and the flow is regulated with the flow meter to the desired rate, in the case of the unit of FIG. 2, to 9 gal/hr (0.15 gal/min). This may require that the throttling valve on the bypass loop for the pump be partially closed in order to attain this flow rate. Immediately, in order to avoid an undesirable build-up of pressure in the unit, the valve for the line coming from the first (tallest) tower (i.e. 26 in FIG. 2) is opened, and the flow regulated with the flow meter to 3 gal/hr (0.05 gal/min). Also, immediately after the recycle line (3 gal/hr) is opened, the water outlet valve is opened and the flow regulated to 6 gal/hr (0.10 gal/min). Once the unit is running, adjustments can be made to the inlet flow by adjusting the throttling valve on the pump bypass loop, the gate valve for the inlet to the unit, and the flow meter for the inlet stream. The inlet should be set near 9 gal/hr, but may fluctuate some. The recycle line should be set for 3 gal/hr, but can be higher depending on the inlet flow. The water outlet flow is the most important and must be carefully regulated to an output rate at which the oil content of the water meets at the desired level, in the case of the unit of FIG. 2, at 6 gal/hr. Once the unit is running, it should be monitored every hour to two hours for a total of five 8-hour shifts. After consistent operation, it should only have to be monitored once or twice a shift. Around the clock operation is possible with this unit, provided that the oil/water storage tank supply is ample enough to feed the unit for the desired amount of time without draining the tank down to the oil/water interface. Shutdown procedures for the unit are in the exact opposite order from the startup. The gate valve on the water effluent stream is closed, the gate valve on the oil/water recycle loop is closed, the throttling valve on the bypass loop is completely opened, the inlet valve to the separator is completely closed, and then the pump is switched off.

The oil and water mixture is fed from the oil/water storage tank through a 50 micron filter. The pump is downstream from the filter and set up with a bypass loop controlled by a throttling (ball) valve. The bypass loop may be twice the diameter or larger than the inlet and outlets of the pump to avoid super-heating of the recirculated fluid which would decrease the separators' efficiency, or other cooling means utilized, when necessary. The inlet flow rate should initially be set at 9 gal/hr, the oil and water recycle loop out of the first oil collector at 3 gal/hr, and the water outlet at 6 gal/hr. These settings may be altered depending on the quality of the water effluent stream. The inlet flow may be increased and the outlet flows adjusted accordingly to yield a higher wastewater processing capacity. The flows should be systematically and gradually increased in the same proportions between the streams as given and the quality of the water effluent stream measured. If the flow can be increased without a significant increase of the oil concentration in the water effluent stream, then the separator may be run at faster flow rates. Possible issues that may arise due to increased flow rates are: 1) more frequent cleaning/replacing of the filter cartridges; 2) more frequent cleaning/replacement of the hydrophobic beads within the separator; and 3) potential pressurization of the separation unit. The total oil and grease concentration in the water effluent stream should not exceed 100 ppm. The concentration is measured using the Hanby Environmental Laboratory Procedures (H.E.L.P.) Inc. oil-in-water field test kit. Once the process is known to be stable and reliable, the test should only have to be run once a month and can provide insight as to when to change the filters and clean the separator. It is preferred that the unit always be full of water and that the oil level not reaches the bottom horizontal half of the unit. Multiple purges are called for in the event that oil reaches the bottom of the separator or accumulates in the second oil collection tower. The quality of the water effluent will determine when the unit will need cleaning/purging. A second filter is added to the water effluent stream to catch any debris or coalesced oil passing through the unit. It was found using a 30 micron filter reduced the total oil and grease concentration in the water effluent by as much as 10 times (50 ppm to 5 ppm). This filter collects debris containing oil, or the coalesced oil from any emulsion that might have existed.

Periodically, the two filters on this system will have to be changed. The 50 micron (or alternately 40 or 30 micron) filter should be replaced/cleaned when the feed flow to the separator (9 gal/hr) cannot be reached, even when the throttling valve on the bypass loop is completely closed. The 30 micron filter (or alternately 20, 15, or 10 micron) on the water effluent line should be replaced when the total concentration of oil and grease exceeds 15 ppm. Although the federal standard for oil and grease content in sewagable water is 100 ppm, it is desirable to maintain a much lower concentration since otherwise, recycle of the water could foul the surfaces of the heat exchangers, etc. When changing the filters no longer produces the desired results, the separator must be cleaned. One method is to connect a water line (i.e. garden hose) to the water outlet of the separator, open the purge valves, open the feed line and recycle line valves and back-flush the separator with water. The higher the flow rate of the back-flushed water and the longer it is run will determine the level of cleaning. The back-flush water flow should be in the exact opposite direction as the flow in the separator under normal operating conditions. The water that is used to back-flush the separator must be collected in the oil/water storage tank and later processed by the separator. If this type of cleaning does not produce the desired results, the unit may be emptied, cleaned, and re-filled with new hydrophobic beans and the start-up procedure re-implemented. Additionally, any water that is spilled in the containment area should be considered oily water and therefore should be processed by the separator. The overall performance of the separator unit will be heightened significantly if:

After the oil/water storage tank is filled, it is allowed to settle for an hour or two. If it is continuously filled, the quasi-static fluid in the tank is disturbed as little as possible.

The feed contains as little oil, dirt, and particulate matter as possible.

The filters are cleaned or replaced on a regular basis.

The hydrophobic beads in the separator are cleaned/replaced when necessary. General maintenance schedules will vary based on usage, flow rates, oil/water feed quality, and water effluent quality.

EXAMPLE 1

A device substantially in accordance with FIGS. 2 and 3 herein was fed a heavily-contaminated oil stream. The feed stream was adjusted to 9 gal/hr, with a 3 gal/hr recycle from the top of the separator (principle oil effluent line 55 from the oil collection tower). Water exited the system at the rate of 6 gal/hr. The results are summarized in Table 1.

TABLE 1

|  | Flow Rate (gal/hr) | Oil Concentration, ppm |
|---|---|---|
| Feed Stream | 9 | 60–10,000* |
| Oil Effluent | 3 | Not Measured |
| Water Effluent | 6 | 2–8 |

*Believed to average 200 ppm

It should be noted that these systems are not particularly effective if the oil contamination at the inlet exceeds about 30% by volume. The final filter is also quite important, as prior to the installation of the filter, the effluent contained 50–60 ppm oil. While this level of oil content is below the upper limit of 100 ppm which is ordinarily desirable, it is most desirable to remove as much oil as possible.

Prior to the installation of the filter, overall oil-removal efficiency was 72%. With the filter, the efficiency rose to 92%. Due to the low cost of these units, higher separation towers or multiple separation towers can easily be implemented. These will increase the efficiency, as will also operation of parallel units to decrease flow rate, series units to increase overall removal without affecting flow rate through individual devices, or even series parallel configuration.

When large scale units are desired, these are generally desired to be of metal construction. Moreover, it is possible in such devices to automatically regulate flow rates in accordance with the content of the various inlet/outlet streams, the height of the various oil/water or (oil/water)/water interfaces, and the like. Use of conductometric sensors, hall effect sensors, etc., or UV or IR absorbence sensors can be used to set the appropriate flow rates automatically.

In a further embodiment, shown in FIG. 4, a long tube mounted at an angle serves as the principle portion of the elongate housing 90 with a plurality of oil and/or oil/water collection tubes 92 mounted at an angle. Such a device may be conveniently positioned along the wall of a building, for example, and may be made to a large scale to achieve efficient separation. Oil water flows into the inlet 94 while "clean" water flows out of the outlet 96. The recycle flows from each successive oil collection tower 92 may be decreased relative to the first tower, as a greater amount of oil will be collected in the first tower, less in the second, and considerably less in the third.

The apparatus of the present invention includes minimally an elongate housing have at least one upwardly extending oil collection tube. A device where the upwardly extending oil collection column and the elongate housing are the same as shown in FIG. 1, while devices where these are not the same tubular structure are shown in FIGS. 2 and 4.

While the best mode for carrying out the invention has been described in detail, those familiar with the art to which this invention relates will recognize various alternative designs and embodiments for practicing the invention as defined by the following claims.

What is claimed is:

1. An apparatus for separating an oil and water mixture into an oil enriched component and a substantially oil reduced aqueous component, said apparatus comprising:
   an elongate housing having at least one upwardly extending oil collection tower having a remote terminus;
   said oil collection tower having an oil effluent passage located proximate said remote terminus;
   said elongate housing having a water effluent passage proximate an end of said elongate housing remote from said oil effluent passage;
   said elongate housing having an oil/water inlet passage mediate said oil effluent passage and said water effluent passage;
   said elongate housing containing beads of hydrophobic polymer.

2. The apparatus of claim 1, wherein said oil collection tower also contains beads of hydrophobic polymer.

3. The apparatus of claim 1, wherein at least a portion of said elongate housing is substantially horizontal.

4. The apparatus of claim 1, wherein at least a portion of said elongate housing is maintained at a downward angle from horizontal for at least a portion of said elongate housing between said inlet passage and said water effluent passage.

5. The apparatus of claim 1, wherein substantially the entire interior volume of said apparatus contains hydrophobic polymer beads.

6. The apparatus of claim 1, wherein a screen having a mesh size through which said polymer beads cannot pass covers at least one of said inlet passage, oil effluent passage, or water effluent passage.

7. The apparatus of claim 6, wherein a screen covers the interior of each passage connected to the interior of said apparatus.

8. The apparatus of claim 1, wherein said polymer beads comprise high density polyethylene.

9. The apparatus of claim 1, wherein a filter having a pore size of less than 50 $\mu$m is located in or proximate to the water effluent passage such that effluent water must flow through said filter.

10. A process for the removal of oil from oil water employing as an oil/water separator the apparatus of claim 1, said method comprising:
   introducing oily water into the inlet passage,
   contacting said oily water with said hydrophobic polymer beads;
   withdrawing oil or a water and oil mixture from an oil collection tower; and withdrawing water having a substantially reduced concentration of oil from said water effluent passage.

11. The process of claim 10, wherein an oil and water storage tank is attached to said apparatus, a lower oily water outlet from said storage tank feeding oily water to said oil/water inlet.

12. The process of claim 11, wherein the oily effluent of said oil effluent passage comprises oil or water with a substantially increased oil concentration as compared to the oil concentration of the oily water fed to said inlet, said process further comprising recycling said oily effluent from said oil effluent passage to said oil and water storage tank.

13. The process of claim 12, wherein the amount of oily effluent recycled is from 10% by volume to about 60% by volume of the oily water feed to the oil/water inlet passage.

14. The process of claim 10, wherein prior to being fed into the inlet passage of said apparatus, said oily water is screened.

15. The process of claim 10, wherein prior to being fed into the inlet passage of said apparatus, said oily water is filtered through a filter having an average pore size of 50 $\mu$m or less.

16. The process of claim 11, wherein oil is periodically or continuously removed from said oil and water storage tank.

17. The process of claim 12, wherein said apparatus has minimally two oil collection towers, a first tower having an effluent passage through which oil or oil and water pass back to said oil and water storage tank as a first recycle stream, and wherein a second oil collection tube is monitored and discontinuously emptied of accumulated oil- or oil-enriched water, or wherein a second oil collection tube is optionally monitored, and a second recycle stream of oil-enriched water is continuously removed and fed back to said oil and water storage tank or to said oily water inlet.

18. The process of claim 17, wherein the volume of said second recycle stream is less than the volume of said first recycle stream when the second recycle stream is a continuous stream.

19. The process of claim 18, wherein said oily water contains less than 30% by volume of oil and greater than 100 ppm oil, and the water effluent stream contains less than 100 ppm oil.

20. The process of claim 19, wherein the water effluent stream contains less than 20 ppm oil.

* * * * *